US012330351B2

(12) United States Patent
Weiger et al.

(10) Patent No.: US 12,330,351 B2
(45) Date of Patent: Jun. 17, 2025

(54) MOLD INSERT FOR USE IN A MOLD FOR THE MANUFACTURE OF A CUSHIONING ELEMENT FOR SPORTS APPAREL

(71) Applicant: adidas AG, Herzogenaurach (DE)

(72) Inventors: Helge Weiger, Nuremberg (DE); Bastian Gothe, Erlangen (DE); Maximillian Drexler, Wilhermsdorf (DE); Andreas Seefried, Veitsbronn (DE); Marc Simon Anthony Norridge, Fuerth (DE); Jarkko Siltamaeki, Fuerth (DE); Dan Price, Herzogenaurach (DE); Tru Le, Herzogenaurach (DE); Christoph Dyckmans, Nuremberg (DE); Victor Romanov, Kreuzwertheim (DE)

(73) Assignee: adidas AG, Herzogenaurach (DE)

(*) Notice: Subject to any disclaimer, the term of this patent is extended or adjusted under 35 U.S.C. 154(b) by 0 days.

(21) Appl. No.: 18/414,109

(22) Filed: Jan. 16, 2024

(65) Prior Publication Data
US 2024/0149505 A1   May 9, 2024

Related U.S. Application Data

(63) Continuation of application No. 17/070,806, filed on Oct. 14, 2020, now Pat. No. 11,904,513.

(30) Foreign Application Priority Data

Oct. 15, 2019 (DE) .......................... 102019215838.2
Oct. 5, 2020 (EP) ..................................... 20200125

(51) Int. Cl.
B29C 44/12 (2006.01)
B29C 35/08 (2006.01)
B29C 44/58 (2006.01)
B29D 35/12 (2010.01)
B29K 105/04 (2006.01)
B29L 31/50 (2006.01)
B33Y 80/00 (2015.01)

(52) U.S. Cl.
CPC ...... B29C 44/1271 (2013.01); B29C 35/0805 (2013.01); B29C 44/58 (2013.01); B29D 35/122 (2013.01); B29K 2105/048 (2013.01); B29L 2031/504 (2013.01); B33Y 80/00 (2014.12)

(58) Field of Classification Search
CPC . B29C 44/1271; B29C 44/1276; B29C 44/58; B29C 35/0805; B29C 44/12; B29C 45/14008
See application file for complete search history.

(56) References Cited

U.S. PATENT DOCUMENTS

2009/0267264 A1  10/2009  Tranter et al.
2017/0165792 A1*  6/2017  Buller ................... B29C 64/214
2018/0154598 A1*  6/2018  Kurtz ...................... A43B 13/04

FOREIGN PATENT DOCUMENTS

| CN | 101208993 | 6/2008 |
|---|---|---|
| CN | 203649402 | 6/2014 |
| CN | 103978620 | 8/2014 |
| CN | 105856483 | 8/2016 |
| CN | 108127840 | 6/2018 |
| CN | 110099778 | 8/2019 |
| DE | 19744165 | 12/1999 |
| DE | 102015202013 | 8/2016 |
| DE | 102016100690 | 7/2017 |
| DE | 202017107149 | 3/2018 |
| DE | 102016123214 | 6/2018 |
| DE | 102016223980 | 6/2018 |
| DE | 102017122769 | 4/2019 |
| EP | 3053732 | 8/2016 |
| WO | 2012/133406 | 10/2012 |

OTHER PUBLICATIONS

Office Action, European Patent Application No. 20 200 125.1, Mar. 21, 2024, 4 pages.
European Patent Application No. 20200125.1, Extended European Search Report mailed on Feb. 12, 2021, 7 pages.
German Patent Application No. 102019215838.2, Office Action, Sep. 4, 2020, 10 pages (English machine translation provided).
Chinese Application No. 202011101883.7, Office Action mailed on Mar. 9, 2022, 15 pages (9 pages of Original Document and 6 pages of English translation).
German Application No. 102019215838.2, Office Action mailed on Mar. 10, 2022, 6 pages (3 pages of Original Document and 3 pages of English translation).
European Application No. 20200125.1, Office Action mailed on May 9, 2022, 5 pages.
Chinese Application No. 202011101883.7, Office Action mailed on Aug. 16, 2022, 7 pages (3 pages of Original Document and 4 pages of English Translation).

(Continued)

Primary Examiner — Stella K Yi
(74) Attorney, Agent, or Firm — Kilpatrick Townsend & Stockton LLP

(57) ABSTRACT

An aspect of the present invention relates to a mold insert for use in a mold for the manufacture of a cushioning element for sports apparel. Further aspects of the present invention relate to a mold using such a mold insert, a method for the manufacture of a cushioning element for sports apparel using such a mold, and a cushioning element manufactured by such a method.

19 Claims, 3 Drawing Sheets

(56) References Cited

OTHER PUBLICATIONS

Office Action, Chinese Patent Application No. 202011101883.7, Nov. 25, 2022, 13 pages.
Office Action, European Patent Application No. 20200125.1, Nov. 24, 2022, 7 pages.
Office Action, European Patent Application No. 20200125.1, Jul. 25, 2023, 5 pages.
U.S. Appl. No. 17/070,806, Final Office Action, Jul. 28, 2023, 8 pages.
U.S. Appl. No. 17/070,806, Non-Final Office Action, Aug. 16, 2022, 8 pages.
U.S. Appl. No. 17/070,806, Non-Final Office Action, Feb. 6, 2023, 7 pages.
U.S. Appl. No. 17/070,806, Notice of Allowance, Oct. 16, 2023, 8 pages.
Extended European Search Report, European Patent Application No. 24217360.7, Feb. 24, 2025, 10 pages.

\* cited by examiner

MOLD INSERT FOR USE IN A MOLD FOR THE MANUFACTURE OF A CUSHIONING ELEMENT FOR SPORTS APPAREL

CROSS REFERENCE TO RELATED APPLICATION

This application is a continuation of U.S. patent application Ser. No. 17/070,806, filed Oct. 14, 2020 ("the '806 application"), which is related to and claims priority benefits from German Patent Application No. 102019215838.2, filed on Oct. 15, 2019 ("the '838 application"), and European Patent Application No. 20200125.1, filed on Oct. 5, 2020 (the '125 application"). The '806, '838, and '125 applications are hereby incorporated herein in their entirety by this reference.

FIELD OF THE INVENTION

The present invention relates to a mold insert for use in a mold for the manufacture of a cushioning element for sports apparel, particularly for the manufacture of a shoe sole or a midsole, wherein the cushioning element is manufactured from particles of an expanded material, and wherein an electromagnetic field is used as an energy carrier to fuse the particle surfaces. The present invention also relates to a mold using such a mold insert.

The present invention further relates to a method of structuring such a mold insert using optimization methods, and to a method of manufacturing a mold insert structured in this manner.

In addition, the present invention relates to a method for the manufacture of a cushioning element for sports apparel, particularly a shoe sole or a midsole, from particles of an expanded material, wherein an electromagnetic field is used as an energy carrier to fuse the particle surfaces, and wherein the method uses such a mold. The present invention further relates to a cushioning element, particularly a shoe sole or a midsole, manufactured by such a method.

BACKGROUND

Over the recent years, the use of particle foam materials, i.e., materials made from individual particles of expanded plastic materials, has found its way into the manufacture of cushioning elements for sports apparel, particularly the manufacture of shoe soles for sports shoes. In particular, the use of particles of expanded thermoplastic polyurethane (eTPU), which are fused at their surfaces by subjecting them to pressurized steam within a mold (often called "steam chest molding" in the art), has been considered for the manufacture of shoe soles. In this context, the use of particles from eTPU has turned out to be desirable because their use can result in shoe soles with low weight, good temperature stability and small hysteresis-losses with regard to the energy exerted for the deformation of the sole during running, i.e., a good energy return to the wearer of the shoe.

However, to obtain dimensionally stable components of a high quality, the heat energy must also be provided to the interior of the component in order to obtain a sufficient degree of fusion between the particles. For heat energy supplied by steam (or, even worse, when a liquid binder material is used, which has also been considered), this is only possible up to a certain thickness and packing density of the particles in the mold and, beyond a certain 'threshold' thickness or density, steam-chest molding will generally lead to imperfections, particularly in the interior of the component.

Another disadvantage of using steam as an energy carrier is that a major share of the energy stored within the steam may be lost heating the mold instead of being supplied to the particle surfaces. This can, on the one hand, necessitate a long preheating phase until the mold (often made from metal materials) is heated up to a saturation temperature, and can, on the other hand, delay stabilization and cooling of the fused component since the mold may have stored a large amount of heat energy that delays cooling. Moreover, as conventional molds are usually large in their dimensions, this results in a slow heating of the mold and a significant associated energy consumption. Therefore, the method may be protracted and very energy inefficient.

To address these drawbacks, energy carriers other than pressurized steam have therefore been considered. In particular, a method for the manufacture of a cushioning element for sports apparel that comprises loading a mold with a first material comprising particles of an expanded material and fusing the surfaces of the particles by supplying energy in the form of at least one electromagnetic field has been described in DE 10 2015 202 013 A1 and EP 3 053 732 A1.

However, the methods disclosed in these two applications still leave room for improvement because they do not yet take full account of the complex geometry of the parts that, in particular, modern performance footwear like running shoes often include, specifically when it comes to their soles and midsoles. The complex geometry of these parts, in turn, puts very high demands on the manufacturing equipment and manufacturing methods. For the case of using particle foam materials in the soles and midsoles, this means having to ensure that also for sole geometries with noticeable variations in thickness, curvature, contouring, etc., an even and stable connection between the particle surfaces must be ensured in all areas of the sole and throughout the interior of the sole. With the known methods and machinery, this may be difficult or in some cases even impossible to achieve.

Based on the described prior art, it is therefore a problem of the present invention to provide improved tools and methods for the manufacture of cushioning elements for sports apparel from particles of expanded materials and using an electromagnetic field as an energy carrier, which allow the production of high-quality products with complex geometry. Another problem that is addressed by the present invention is the provision of improved methods to make such tools.

BRIEF DESCRIPTION OF THE DRAWINGS

In the following detailed description, embodiments of the invention are described referring to the following figures.

SUMMARY

Figure 1:
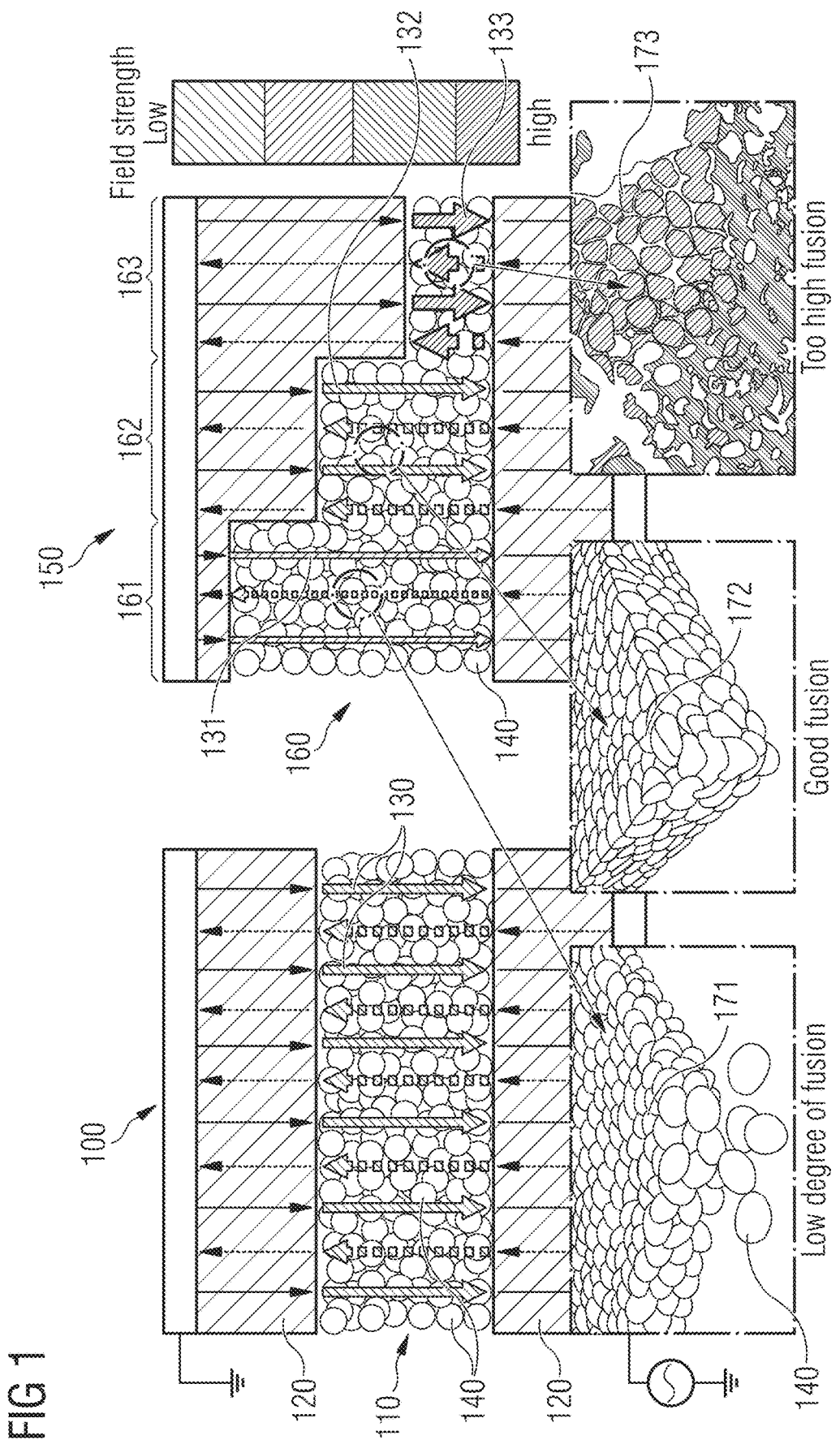
FIG. 1: Illustration of the technical complications arising for the manufacture of cushioning elements having complex geometrical features from particles of expanded material using an electromagnetic field as an energy carrier for the fusion of the particle surfaces.

The terms "invention," "the invention," "this invention" and "the present invention" used in this patent are intended to refer broadly to all of the subject matter of this patent and the patent claims below. Statements containing these terms should be understood not to limit the subject matter described herein or to limit the meaning or scope of the patent claims below. Embodiments of the invention covered by this patent are defined by the claims below, not this summary. This summary is a high-level overview of various embodiments of the invention and introduces some of the concepts that are further described in the Detailed Description section below. This summary is not intended to identify key or essential features of the claimed subject matter, nor is it intended to be used in isolation to determine the scope of the claimed subject matter. The subject matter should be understood by reference to appropriate portions of the entire specification of this patent, any or all drawings and each claim.

In some aspects, the present disclosure is directed to a mold insert for use in a mold for the manufacture of a cushioning element for sports apparel, a. wherein the cushioning element is manufactured from particles of an expanded material, b. wherein an electromagnetic field is used as an energy carrier to fuse the particle surfaces, c. wherein the mold insert has been manufactured using an additive manufacturing method, and d. wherein the mold insert is adapted to locally adjust the field strength of the electromagnetic field inside a molding cavity of the mold, based at least in part on the geometry of the cushioning element. The mold insert may be adapted to increase the homogeneity of the field strength throughout molding cavity during the manufacture of the cushioning element. The local adjustment of the field strength inside the molding cavity may be at least partially caused by a local variation in the dielectric properties of the mold insert. The local adjustment of the field strength inside the molding cavity may be at least partially caused by a local variation in the permittivity of the mold insert. The local variation in the permittivity of the mold insert may be at least partially caused by a local variation in the density of the material of the mold insert. In some aspects, a higher density of the material of the mold insert results in a higher permittivity of the mold insert. The local density of the material of the mold insert may lie between 0.4 g/cm$^3$ and 1.7 g/cm$^3$. The local adjustment of the field strength inside the molding cavity may be at least partially caused by a local variation in the dielectric loss factor of the mold insert. The local dielectric loss factor of the mold insert may lie between 0.01 and 0.10, in particular between 0.01 and 0.07. The mold insert may be arranged adjacent to the molding cavity and influences the geometry of the molding cavity. The mold insert may be arranged adjacent to the molding cavity and influences the geometry of the molding cavity and the local variation in the dielectric loss factor may further influence the amount of surface heat-up of the surface of the mold insert which is adjacent to the molding cavity during the manufacture of the cushioning element. In some aspects, the cushioning element is a sole for a shoe, in particular a midsole.

In some aspects, the present disclosure is directed to a mold for the manufacture of a cushioning element for sports apparel from particles of an expanded material, a. wherein an electromagnetic field is used as an energy carrier to fuse the particle surfaces, and b. wherein the mold comprises a mold insert according to the above paragraph.

In some aspects, the present disclosure is directed to a method for the manufacture of a cushioning element for sports apparel from particles of an expanded material, a. wherein an electromagnetic field is used as an energy carrier to fuse the particle surfaces, and b. wherein the method uses a mold according to the above paragraph.

In some aspects, the present disclosure is directed a cushioning element manufactured with the method according to the above paragraph. In some aspects, the cushioning element is a sole. In some aspects, the cushioning element is a midsole.

BRIEF DESCRIPTION

The above-outlined problem is addressed and is at least partly solved by the different aspects of the present invention.

A first aspect of the present invention relates to a mold insert. In an embodiment, a mold insert for use in a mold for the manufacture of a cushioning element for sports apparel is provided, particularly for the manufacture of a shoe sole or a midsole, wherein the cushioning element is manufactured from particles of an expanded material, and wherein an electromagnetic field is used as an energy carrier to fuse the particle surfaces. The mold insert has been manufactured using an additive manufacturing method, and the mold insert is adapted to locally adjust the field strength of the electromagnetic field inside a molding cavity of the mold, based at least in part on the geometry of the cushioning element.

One advantage of using an electromagnetic field (in the following sometimes simply called "the field", for conciseness), in particular, electromagnetic radiation, as an energy carrier in the fusion of particles of expanded material compared to using steam is that the provision of energy by the electromagnetic field is not coupled to the transport of mass. An electromagnetic field can therefore (under certain conditions, e.g., that the mold is not entirely or predominately made from metal or another electroconductive material) permeate the interior of the component that is being molded more easily and, thus, lead to an even and consistent fusion of the particles throughout the component. Generally speaking, the electromagnetic field leads to a dielectric heating of the particles and the particle surfaces, which then fuse together to form the molded component.

For components with a 'regular' geometry, like simple plates of material with a constant thickness throughout and using only one kind of material, e.g. particles of expanded material, the surfaces of the material such as the surfaces of all of the particles will heat up quite uniformly, leading to an even and consistent fusion throughout the plate.

However, for components such as cushioning elements with complicated geometry, for example, the shoe soles often encountered in modern performance footwear, the situation becomes more involved. Due to the complex geometry of the cushioning element, the molding cavity in which it is manufactured will have regions with varying thickness, curvature, contouring, etc., too. This will in general distort the electromagnetic field permeating the mold and the molding cavity and lead to some regions with increased field strength, while other regions may suffer a 'dilution' i.e. a reduced field strength of the electromagnetic field. Since the energy density in the electromagnetic field is $\omega \propto \vec{E} \cdot \vec{D}$ (leaving out the magnetic contribution, and where $\vec{E}$ is the electric field and $\vec{D}$ is the electric displacement field), this means that more energy is provided to the particles in the regions of increased field strength, compared to the regions of reduced field strength. This can lead to an uneven and inhomogeneous fusion of the particle surfaces and, eventually, to a flawed and unacceptable final product.

To address this problem, the inventive mold insert is shaped in such a manner that it compensates, at least partially, for this effect. In principle, two options are possible in this regard:

First, the mold insert may be placed into the mold in such a manner that it locally adjusts the field strength inside the molding cavity without influencing the geometry of the molding cavity. The insert may, for example, be 'sandwiched' between other parts of the mold.

Second, the mold insert may not only locally adjust the field strength inside the molding cavity, it may also itself define at least part of the molding cavity. For example, the mold insert may be arranged directly adjacent to the molding cavity and form part of the wall of the molding cavity (or it may at least define the geometry of part of the molding cavity but be further coated or covered by additional layers of material, for example).

In any case, there is an interplay between the mold insert and the geometry of the component, such as the above-mentioned cushioning element, that is being manufactured. The interplay is such that the mold insert takes account of the geometry of the cushioning element (and hence the geometry of the molding cavity), and the mold insert adjusts the electromagnetic field specifically for that geometry and as needed to obtain the desired fusion of the expanded particles. This is what is meant by adjusting the electromagnetic field "based at least in part on the geometry of the cushioning element". Of course, other factors have generally to be taken into account, too, like the geometry and material of the rest of the mold and/or the kind of electromagnetic field that is used. Therefore, the adjustment will only be based "in part" on the geometry of the cushioning element. Still, the mold insert is tailored for the specific geometry of a given cushioning element, and different inventive mold inserts will generally be used for different component geometries.

A further factor that must be considered in this regard is the kind of particles that are used. While the mold insert may initially be designed to adjust the electromagnetic field in the empty molding cavity in the desired manner (for example, as a first-order approximation in the design of the mold insert), the ultimate goal is to adjust the field as desired in the filled state of the mold, because it is in this state that the electromagnetic field will pass its energy to the particle surfaces for their fusion (and generally also to their bulk volume). Since the particles themselves have certain dielectric properties—which generally change for different base compounds from which the particles may be made, for example—these properties should desirably be taken into account in the design of the mold insert, so that the electromagnetic field has the desired distribution throughout the filled molding cavity during the actual fusion process.

The particles of expanded material for the cushioning element may comprise at least one of the following materials: expanded thermoplastic polyurethane (eTPU), expanded polyamide (ePA), expanded polyether-block-amide (ePEBA); expanded polylactide (ePLA); expanded polyethylene terephthalate (ePET); expanded polybutylene terephthalate (ePBT); expanded thermoplastic polyester ether elastomer (eTPEE).

For example, for use in the manufacture of shoe soles, particles of eTPU, ePEBA and/or ePA have turned out to be desirable and may hence be used in the context of the present invention.

To allow the desired adjustment, creating the mold insert with an additive manufacturing process is particularly suitable. Additive manufacturing processes allow for a fine-tuned control not only of the general geometry of the mold insert, but also its interior, which can play an important role in providing the desired 'distortion' to the electromagnetic field. Moreover, modern additive manufacturing processes allow the production of parts in a very short timeframe and on-site, such that the product development process is not stopped (at least not for very long) by having to wait for the manufacture or re-manufacture/adaption of the manufacturing tools, which conventionally often delay the process by days or even weeks.

Designing the mold insert for additive manufacture can involve one or several options and methods, wherein combinations are, of course, also possible. The simplest case would be a simple trial-and-error approach, which may be feasible due to the short time it takes from providing the design of the mold insert until the finished mold insert is produced, due to the fact that additive manufacturing is used. A second approach is to use computer simulations of the distribution of the electromagnetic field (e.g. the local field strength) through the mold and, in particular, the mold insert and molding cavity.

One possibility for designing the mold insert may use a desired target distribution of the electric displacement field D in the (filled) molding cavity as a starting point. As is known from standard electrodynamics, on a macroscopic level and inside a dielectric material the electric displacement field D describes the combined effect of an externally applied electric field and the polarization effects induced inside the dielectric material by the external field, and in this sense represents the "effective field" inside the material. The electric displacement field D is therefore suitable quantity to consider for specifying a design target for the mold insert in the context of the present invention. However, other "target functions" (e.g., a desired distribution of the electric field E are also possible.

As further described below, the local adjustment of the field strength inside the molding cavity can e.g. be caused (at least in part) by a local variation in the (relative) permittivity of the mold insert, which can in turn be influenced by a local variation in the density of the material of the mold insert. In addition, the material or material mixture used in different parts and regions of the mold insert can also influence the permittivity of the mold insert, and hence the field distribution inside the molding cavity.

As also further described in detail below, the mold insert is made using additive manufacturing methods (e.g., 3d-printing- or deposition techniques), which generally involve controlling both the fill- or feeding rate with which material is supplied to the "printing head" of the additive manufacturing device, as well as the composition of the material used for the additive build-up process of the mold insert.

An optimization process for designing the mold insert may therefore be based on the fill- or feeding rate as well as the material composition or "mixing rule" as input parameters, and the above-described target function, e.g., the desired electric displacement field D in the (filled) molding cavity, as a design goal. To perform the optimization, the (as yet unknown) structure or shape of the mold insert may, for example, be discretized into a lattice of cells or pixels, and at each lattice site the local density of the mold insert as a function of the fill rate and mixing rule may be varied and optimized, by using the dielectric heating equation to compute the field distribution inside the molding cavity that results from a given distribution of local densities over the lattice sites (further physical parameters besides the local density may be involved in the optimization process, too).

By varying the density distribution over the lattice, the effect on the resulting field distribution inside the molding cavity may be investigated, and an optimal configuration may thus be chosen or determined (e.g., by minimizing an "energy function"). Since the local density is, in turn, specified as a function of the fill rate and mixing rule, the density distribution obtained as a result of the optimization process can eventually be translated into a set of parameters and instructions that allow the manufacture of an optimized mold insert or structure by using additive manufacturing methods.

In any case, once the design has been created on a computer, for example, it may be manufactured quickly and then verified by test runs on an actual machine, and subsequently further tuned or altered, if necessary. Due to the use of additive manufacturing processes, it may be possible that the entire process from the first design to an acceptable tool may be done on a short timeframe of a few weeks or even days.

The mold insert can, in particular, be adapted to increase the homogeneity of the field strength throughout the molding cavity during the manufacture of the cushioning element.

Since the energy density in the electromagnetic field is $\omega \partial \vec{E} \cdot \vec{D}$ (again leaving out the magnetic contribution), a homogeneous field strength will facilitate an even fusion of the particles throughout the cushioning element, such that homogenizing the field is particularly suitable to obtain cushioning elements with consistent and even fusion of the particle surfaces throughout.

On the other hand, by reversing the argument, it is also clear that the mold insert may be used to create specific regions in the field distribution (e.g., the local value of the field strength) where an increased or reduced amount of fusion will take place (assuming the same particles are used everywhere; otherwise the varying composition of the particles will also have an effect on the amount of fusion). This may be desirable to provide different regions of the cushioning elements with different performance properties like stiffness, for example.

The local adjustment of the field strength inside the molding cavity can at least partially be caused by a local variation in the dielectric properties of the mold insert.

Of course, a variation in the dielectric properties of the mold insert will, first of all, generally alter the field inside the mold insert itself. However, contrary to the idealized case of an infinitely dimensioned plate condenser into which a plate of dielectric material is inserted and where the field outside the dielectric material is left unaltered due to the formation of 'just the right amount' of polarization charges at the surface of the plate of dielectric material, in the case of a finite-dimension mold insert with a generally complex geometry there will also be an effect on the electromagnetic field outside the mold insert itself and, in particular, within the molding cavity. In particular, this is true if the mold insert is arranged directly adjacent to, or even forms part of, the wall of the molding cavity. The mold insert may in this sense be considered a 'dielectric lens' for the electromagnetic field which changes its distribution throughout the molding cavity.

The local adjustment of the field strength inside the molding cavity can, in particular, be at least partially caused by a local variation in the permittivity of the mold insert.

The permittivity of the mold insert has a direct influence on the field strength inside the mold insert (for a constant 'external' field being applied to the mold), as the skilled person understands, and due to the effects mentioned above, will also influence the field distribution (e.g., the local value of the field strength) inside the molding cavity. A further advantage of using the permittivity as a 'control knob' to influence the field distribution is that materials with a wide variety of permittivity-values are known and available, such that a large degree of tuning and adaption is possible in this manner by choosing and/or combining different materials in the additive manufacturing process.

The local variation in the permittivity of the mold insert may be at least partially caused by a local variation in the density of the material of the mold insert.

Apart from using different materials with different intrinsic permittivity-values, another advantage of using the permittivity to adjust the field is that the same material, but with different densities, may be used in different regions of the mold insert to obtain the desired influence. The density may be a 'strictly localized' density measured in as small a region of the mold insert as this is technically possible, e.g., the density of a sample cube with edges of 1 mm length, or it may be an 'averaged' density measured on a large distance scale, e.g., an average value of the density determined from a sample cube with edges of 5 mm length, or 10 mm length, for example. Since additive manufacturing is used to produce the mold insert, such density variations are furthermore relatively easily achievable, such that the combination of these two aspects is particularly desirable.

For example, one way to obtain such a local variation in the density of the material of the mold insert is by the inclusion of air cavities within the material. The ability to create complex distributions of air cavities is a particular advantage of using additive manufacturing for the mold insert. The inclusion of such air cavities is hence one important option provided by the present invention to locally tune the material density and therefore the permittivity, and hence the field distribution within the molding cavity.

Generally, a higher density of the material of the mold insert results in a higher permittivity of the mold insert.

The local density of the material of the mold insert may lie between 0.4 g/cm$^3$ and 1.7 g/cm$^3$.

For the materials discussed in more detail below that may be used for the additive manufacture of an inventive mold insert, such values are on the one hand technically achievable without too many difficulties, and on the other hand result in mold inserts that strike a desirable compromise, for example, between heat-up of the mold itself and the degree of influence on the field inside the molding cavity. If the density is too low, the mold insert will generally not heat up sufficiently, which will be detrimental to the fusion, and, if the density is too high, the mold insert will heat up too much and hence, for example, unnecessarily prolong the fusion and subsequent cooling/curing process.

Suitable values for the local permittivity may lie between 1 and 20, for example.

Alternatively, or in addition, the local adjustment of the field strength inside the molding cavity can at least partially be caused by a local variation in the dielectric loss factor of the mold insert.

Contrary to the case of a variation in the permittivity, a local variation in the dielectric loss factor of the mold insert may not (or only to a more limited degree) have a direct influence on the field distribution, in particular outside the mold insert and within the molding cavity. However, a local variation in the dielectric loss factor of the mold insert may lead to different degrees of energy absorption and hence heating of the different regions of the mold insert. Since the permittivity is generally a function of temperature, these different degrees of heating of the different regions of the mold inserts can cause a local variation in the permittivity which can then cause a local adjustment of the field, also outside the mold insert and, in particular, within the molding cavity.

On the other hand, the local variation in the dielectric loss factor of the mold insert can also have a more direct influence the fusion of the particle surfaces, by virtue of the different degrees of heating, and hence the different degrees of energy emitted into the molding cavity in the form of heat radiation, for example. This influence will generally be the more pronounced the closer the mold insert is arranged to the molding cavity, and it will generally also have a larger effect for the fusion of the particles arranged at the surface of the cushioning element and facing the mold insert than for particles arranged in the interior or at a different side of the cushioning element. This process may therefore intentionally be used, for example, to provide specific properties to a surface layer of a region of the cushioning element. For example, the particles in a surface layer of the cushioning element may be more strongly melted in a region adjacent to a part of the mold insert where it has a high dielectric loss factor and hence emits a large degree of heat into the direction of the molding cavity. Such more strongly melted particles may, after cooling, provide increased stiffness to the respective region of the cushioning element, for example.

Also, while too much energy loss caused by unwanted heating of the mold is generally to be avoided, some degree of heating of the mold and, in particular, the mold insert, may be desirable. This pre-heating may be used to pre-heat the particles of the expanded material prior to their actual fusion which may broaden the processing window and generally facilitate the fusion process.

For example, the local dielectric loss factor of the mold insert can lie between 0.01 and 0.10, in particular between 0.01 and 0.07.

This range has proven to be suitable because it provides a good compromise between the level of energy absorption of the mold insert and enough heating of the mold insert to facilitate fusion, i.e. not too much energy being absorbed by the mold insert on the one hand, but also enough heating of the mold insert to facilitate the fusion of the particle surfaces as described above on the other hand.

Other values are also possible, however which may be up to 0.3. For example, using polyvinylidene fluoride (PVDF), also called polyvinylidene difluoride, in the construction of the mold insert, values of 0.2 or even higher can also be realized. This may allow for a particularly "noticeable" amendment to the field distribution in sections or positions of the molding cavity where this is necessary or deemed desirable, for example.

As already mentioned, the mold insert may be arranged adjacent to the molding cavity and thus influence the geometry of the molding cavity. Specifically, in this case, the local variation in the dielectric loss factor can then also influence the amount of surface heat-up of the surface of the mold insert which is adjacent to the molding cavity during the manufacture of the cushioning element.

The mold insert can hence play a double, or even triple role, in that it not only influences the distribution of the electromagnetic field, but also serves to (partly) define the geometry of the cushioning element and may even influence the temperature inside the molding cavity, which is an important parameter in the fusion process.

The additive manufacturing method for the mold insert can comprises at least one of the following methods: 3d printing; a micro-melt-drop based method; a powder-bed based method; stereolithography, SLA; selective laser sintering, SLS; selective laser melting, SLM; continuous liquid interface production, CLIP; fused deposition modeling, FDM; digital light processing, DLP; multi jet modeling, MJM; a polyjet method; a film transfer imaging method, FTI; electron beam melting, EBM; electron beam additive manufacturing, EBAM; subtractive rapid prototyping, SRP.

At least one of the following materials may be used for the mold insert: a ceramic filled resin; a cyanate ester; a polylactic acid/polylactide, PLA; an acrylonitrile butadiene styrene, ABS; polyamide 6/nylon 6, PA6; polyamide 66/nylon 66, PA66; polyamide 12/nylon 12, PA12; a polyether ether ketone, PEEK; a binder system; an epoxy resin; a UV-curing thermoset.

Combinations of different methods and/or different materials are also possible.

The electromagnetic field can provide the energy to fuse the particle surfaces in form of electromagnetic waves in the radiofrequency part of the spectrum of 30 kHz-300 MHz, or in the microwave part of the spectrum of 300 MHz-300 GHz, in particular, in the form of electromagnetic waves with a frequency in the range of 25-30 MHz.

The use of these kinds of radiation are desirable for a number of reasons. First, both radiofrequency- and microwave generators are commercially available and may be implemented into a manufacturing tool with comparatively little effort. In addition, it may be possible to focus the radiofrequency- or microwave radiation generally onto the molding cavity such that the energy efficiency of the method is increased. Furthermore, the intensity and frequency of the radiofrequency- or microwave radiation may easily be changed and adapted to the respective requirements. Particularly, the use of radiation with a frequency in the range of 25-30 MHz has turned out to be desirable in the context of the present invention. In combination with the above-described materials and mechanisms regarding the inventive mold insert, this frequency range allows a good control of the field distribution inside the molding cavity.

The cushioning element can, in particular, be a sole for a shoe, more particularly a midsole.

As mentioned, shoes sole and, in particular, midsoles nowadays often have quite a complicated geometry. The use of an inventive mold insert in the production of such elements brings the advantages of the present invention to particular fruition.

A further aspect of the present invention relates to a mold. In an embodiment, a mold for the manufacture of a cushioning element for sports apparel from particles of an expanded material is provided, wherein an electromagnetic field is used as an energy carrier to fuse the particle surfaces. The mold comprises embodiments of an inventive mold insert.

It goes without saying that all of the features, feature-combinations, options and possibilities described in this application with regard to the mold insert may be applied to the case of a full molding tool, too, and also in the manufacturing method described herein.

In an embodiment, the mold comprises at least two mold parts, and each of the two mold parts comprises an electrode that is used in the provision of the electromagnetic field. The mold insert is placed into one of the two mold parts, and the two mold parts may be moved relative to one another in a first direction to open the mold in order to allow loading the mold with the particles, and the two mold parts can further be moved relative to one another in a second direction to close the mold in order to form the molding cavity between the electrodes.

Such a setup allows for an easy exchange of the mold insert and the general operation of the mold. In particular, in the case that the mold insert at least partially also defines the geometry of the molding cavity, the same overall tool may be used with different mold inserts for the production of a number of different cushioning elements.

It is also possible that a mold insert is used that completely surrounds the molding cavity, for example a mold insert with a first part (e.g. a top part) and a second part (e.g., a bottom part) which are placed into the two mold parts (e.g., using a mold with an upper mold part and a lower mold part).

It is also mentioned, however, that the tool may itself be tailored towards the manufacture of a specific type or class of cushioning element, for example, a specific type of midsole. In particular, the geometry of one or both of the electrodes may be such that the generated electromagnetic field is already basically tuned for the manufacture of the midsole (or some different kind of cushioning element), and that an inventive mold insert is then used to further adjust the electromagnetic field on a finer level, e.g., to take account of different shoe sizes, different overpronation-/underpronation-protection-characteristics desirable for the sole, different additional sole elements like torsion bars that may or may not be included in the sole, and so forth.

For example, the above-mentioned two mold parts or at least a portion of them may comprise capacitor plates as electrodes, which may be arranged on an inner side of the mold parts (i.e. on the side of the parts facing the molding cavity). These mold parts may be comprised of a layered construction such as a base plate, a molding plate defining at least part of the molding cavity and an insulating layer on the inside of the molding plate (i.e. the side facing the cavity). The capacitor plates may also be included in such layered constructions. In some embodiments, other layered constructions are used.

In an embodiment, the thickness of the molding plates and/or the capacitor plates is varied. For example, by varying the thickness of the molding plates and/or the capacitor plates, the mold parts may be contoured. This allows fine tuning of the energy that is to be applied to the midsole (or some different kind of cushioning element or component) in the tooling mold. In some embodiments, the capacitor plates may be adjusted as it might allow to keep the same molding plates which may be more economical than adjusting the molding plates themselves.

Of course, adaptability to such factors may also be achieved solely (but maybe to a smaller degree) by using an inventive mold insert, together with two 'standard' electrodes that are not specifically geared towards a particular product or product class. In this sense, the use of inventive mold inserts can also help to enlarge the field of applicability of a standard molding tool or mold assembly.

Another aspect of the present invention is provided by method for making an inventive mold insert using an additive manufacturing process. The method may include an optimization process of the structure of the mold insert as described above, wherein a target function is specified and the mold structure is optimized to meet the specifications provided by the target function. In particular, the optimization process may employ the fill rate as well as the material composition or mixing rule of the material used for the additive manufacturing process of the mold insert as input parameters, and the desired electric displacement field in the (filled) molding cavity as a design goal. To perform the optimization, the (as yet unknown) structure or shape of the mold insert maybe discretized into a lattice of cells or pixels, and at each lattice site the local density of the mold insert as a function of the fill rate and mixing rule may be varied and optimized, by using the dielectric heating equation to compute the field distribution inside the molding cavity that results from a given distribution of local densities over the lattice sites. The optimized local density distribution may then be translated into a set of parameters and/or instructions that are used by an additive manufacturing machine to create the mold insert using the determined fill rate and mixing rule.

An example implementation for the above-mentioned optimization process of the structure of the mold insert will be explained in detail in the following:

An additive manufactured version of a tooling mold for the dielectric heating process may be constructed. Within this tooling mold, a complex 3D-shape of an additive manufactured structure of the mold insert containing multiple different heights, widths and material densities may be shaped to form the molding cavity. Within this molding cavity, a component made from an expanded thermoplastic elastomer (eTPE), such as particles from expanded thermoplastic polyurethane (eTPU) for the above-mentioned cushioning element, may be manufactured. The additive manufactured tooling mold itself may comprise conductive aluminum electrodes, e.g. anode and cathode, and a dielectric mold insert material surrounding the material of the component.

Initially, the dielectric mold insert may be printed with a material fill rate of 100%, i.e. the dielectric mold insert may be formed out of a full density of the selected dielectric mold insert material. For example, a polylactic acid/polylactide, PLA; an acrylonitrile butadiene styrene, ABS; polyamide 6/nylon 6, PA6; polyamide 66/nylon 66, PA66; polyamide 12/nylon 12, PA12; a polyether ether ketone, PEEK; a polyethylene terephthalate, PET; a PE material; a polytetrafluorethylene, PTFE; a binder system; an epoxy resin; a UV-curing thermoset may be used.

Upon inspection of the performance of this tooling mold construction by using a Finite Element Method (FEM) simulation approach supplied with other relevant process parameters (such as the frequency of a supplied A/C voltage generated by an electromagnetic field generator and a voltage value applied between the anode and the cathode electrodes), the electric field strength occurring within the dielectric mold insert material and within the material of the component may be computed based on the Maxwell's equations. This initial computation may reveal an uneven distribution of the electric field strength, whereby the electric field strength within the component may appear highest in areas of lower material densities of the component's material and may correspondingly appear lower in areas of high material density.

To average out the observed differences in the occurring electric field strength, the optimization process according to the present application may be used to design the topology of the additive manufactured dielectric mold insert. Here, a volumetric integral function may be calculated for the normalized electric field distribution across the component within the molding cavity. This value may be denoted by $E_{av}$. For each point in the corresponding normalized field distribution, the following objective function Phi, φ, may be applied:

$$\varphi = (E_{pp} - E_{av})^2 [\frac{kg^2 * m^2}{s^6 A^2}]$$

where $E_{pp}$ may be the computed electric field strength density for each infinitesimally small point in the molding cavity. In order to optimize for the occurring material density within the dielectric mold insert, a topology optimization density model may be applied to all such volumetric regions of the mold insert geometry. A domain control variable may be discretized on nodes or elements and a fictitious material may be introduced to account for the material boundary in an implicit way. An interpolation may be then constructed such that the physical governing equation may be solved wherever the control variable may be equal to one, while an equation associated with the fictitious material may be solved where the control variable may be equal to zero. The interpolation may be specific to the physics and may be constructed such that intermediate value of the control variable may be suboptimal.

By applying the Lichtenecker's equation for the bulk material permittivity of the target optimization domain by the following equation:

$$\ln\varepsilon_* = \sum_i^n v_i * \ln\varepsilon_i$$

where $v_i$ is the volume fraction of the $i^{th}$ constituent, $\varepsilon_i$ is the permittivity of the $i^{th}$ constituent, n is the number of total constituents in the component's material and the total volume fraction in the equation is given by $\Sigma_i^n v_i = 1$, the mold insert material model used for the Finite Element Method simulation may be modified during optimization iterations to yield a change in the dielectric permittivity value of the mold insert material. According to the output density model value ($0 \leq \theta_c \leq 1$) of the above-mentioned optimization process, the simulation model may yield an integral solution for the dielectric field strength for each iteration of the optimization cycle.

The termination of the optimization approach may happen either by converging to a set optimality tolerance for the solution, or by reaching a set maximum number of model evaluations. The end result of the above-mentioned optimization process may be a density map across the dielectric mold insert material, yielding a value for the above-mentioned topology optimization density model variable $\theta_c$ for each point across the volume integration of the dielectric mold insert material, which in turn may create a local modification of the source material model properties based on the relationship denoted by the above-mentioned Lichtenecker's equation for the bulk material permittivity of the target optimization domain.

The success of the optimization process may be evaluated by the computation of the dielectric field strength across the molding cavity for the component using the modified material permittivity of the material matrix gained as an output of the density model of the above-mentioned optimization process, and comparing this field strength to the original objective function Phi φ.

The skilled person will understand that this example implementation is only one way for the optimization process according of the present application and other methods, algorithms or approaches may also be applied.

Yet another aspect of the present invention relates to a manufacturing method for a cushioning element for sports apparel, particularly a shoe sole or a midsole. In an embodiment, a method for the manufacture of a cushioning element for sports apparel from particles of an expanded material is provided, wherein an electromagnetic field is used as an energy carrier to fuse the particle surfaces, and wherein the method uses embodiments of the inventive mold.

Further aspects of the present invention relate to a cushioning element, in particular, a sole or a midsole, manufactured with embodiments of the inventive manufacturing method as well as a shoe, in particular, a sports shoe, comprising such a sole or a midsole.

As already explained above, by using an inventive mold insert, it is possible to manufacture cushioning elements with complex geometry which still have the desired fusion and connection between the particles throughout, because the mold insert allows to adjust and adapt the distribution of the electromagnetic field (e.g., the local field strength) within the molding cavity and during the molding process in such a manner that the desired degree of fusion is achieved locally in a controlled manner. This can provide a significant advantage over known methods not using such a mold insert, where such a local control may be difficult or even impossible.

DETAILED DESCRIPTION

Possible embodiments of the different aspects of the present invention are described in the following detailed description primarily with respect to tools and methods for the manufacture of shoe soles. It is emphasized, however, that the present invention is not limited to these embodiments. Rather, it may also be used for different kinds of cushioning elements for sports equipment, sports footwear and sports apparel, like for example knee- or elbow protectors.

Reference is further made to the fact that in the following only individual embodiments of the invention may be described in more detail. The skilled person will understand, however, that the optional features and possible modifications described with reference to these specific embodiments may also be further modified and/or combined with one another in a different manner or in different sub-combinations, without departing from the scope of the present invention. Individual features may also be omitted, if they are dispensable to obtain the desired result. In order to avoid redundancies, reference is therefore made to the explanations in the preceding sections, which also apply to the following detailed description.

FIG. 1 schematically illustrates the technical complications that can arise when an electromagnetic field is used as an energy carrier to fuse particles of expanded material at their surfaces in the manufacture a cushioning element with complex geometrical features.

On the top left of FIG. 1, generally indicated by reference 100, a sketch is shown of the manufacture of a simple plate 110 of material with constant thickness in a mold 120 using an electromagnetic field (indicated by the arrows 130) as an energy carrier to fuse the surfaces of a plurality of particles 140 of an expanded material. Due to the constant thickness of the plate 110 and its simple geometry, the electromagnetic field is essentially homogeneous throughout the tool, as indicated by the constant thickness of the arrows 130, and the fusion of the surfaces of the particles 140 caused by their dielectric heating by the electromagnetic field will therefore generally also be even and consistent.

On the top right of FIG. 1, by contrast, generally indicated by reference 150, the manufacture of a component 160 also from particles 140 of an expanded material but now with a more complex geometry is sketched, here for the case of a component 160 having different thicknesses in different regions 161, 162 and 163. Due to this complex geometry and the resulting shape of the molding cavity of the tool used for the manufacture, the strength of the electromagnetic field used for the fusion of the particles 140 is no longer constant throughout but changes between the different regions 161, 162 and 162, as indicated by the different thicknesses of the arrows 131, 132 and 133 representing the field in these different regions. As a result, while an even and consistent fusion of the surfaces of the particles 140 may still be achieved in one region, e.g., in the middle region 162 (s. the particle foam component generally indicated by reference 172), in the remaining regions 161 and 163 the surfaces of the particles 140 may either show only a low degree of fusion or may even be insufficiently fused (s. the particle foam component generally indicated by reference 171), or they may show too high a degree of fusion and be over-fused or even burnt (s. the particle foam component generally indicated by reference 173).

To address this problem of a potentially inhomogeneous and uneven fusion of the particle surfaces for cushioning elements with complex geometry, the present invention provides an additively manufactured mold insert that serves to at least partially compensate for such effects, by adjusting the electromagnetic field permeating the molding cavity.

Figure 2:
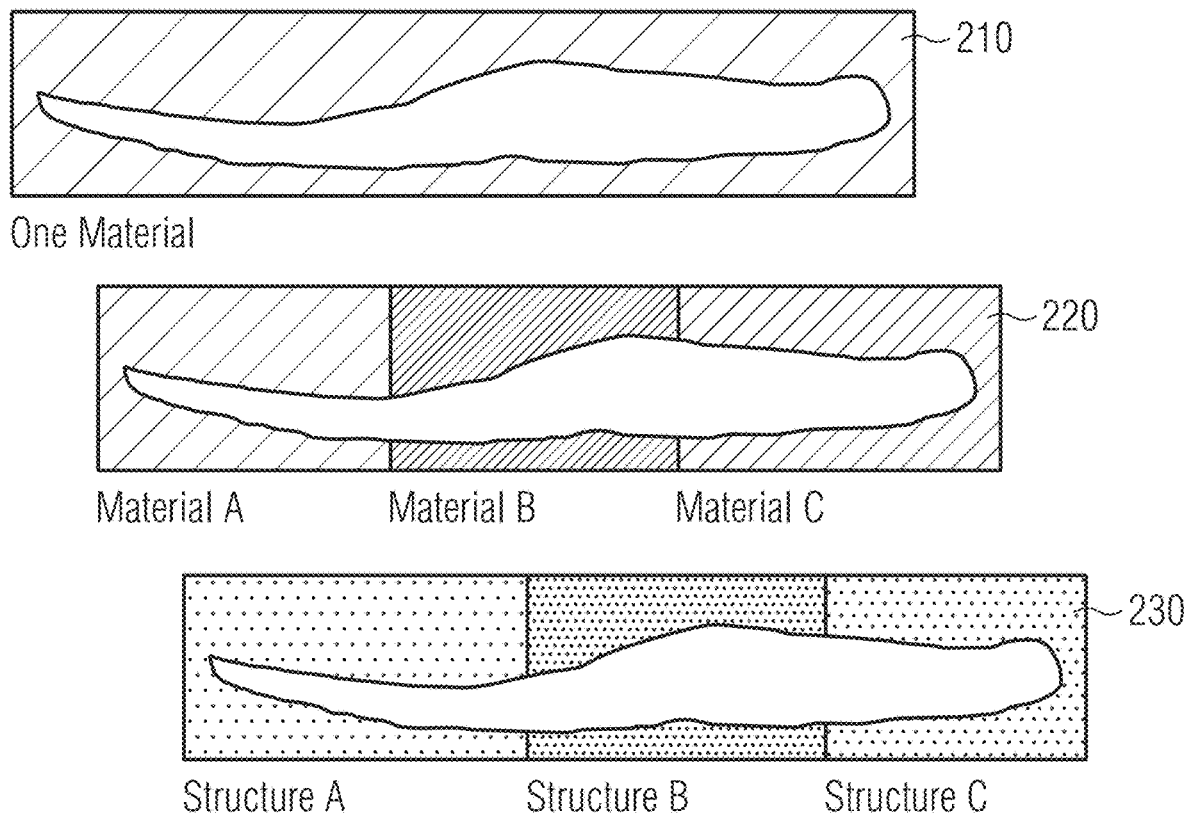
FIG. 2: Embodiments of inventive mold inserts.

FIG. 2 sketches embodiments 210, 220 and 230 of inventive mold inserts. In all three embodiments, the mold insert is depicted as completely enclosing the molding cavity (it is noted, though, that only a two-dimensional cut through the three-dimensional mold insert is shown in each case, which cannot capture all details of the three-dimensional shape of the respective mold insert). It is noted that generally the mold inserts 210, 220, 230 will be separable into at least two parts, for example a top part and a bottom part, such that the molding cavity may be loaded with the particles and the fused component be removed from the mold. Such separation lines between the different parts of the mold insert are not shown in FIG. 2, however, for simplicity.

It is further mentioned that an inventive mold insert may e.g. also be provided as an insert for only an upper part or a lower part of a mold in which it is used (more details on such a mold follow below), and hence only be bordering the molding cavity on one side. As already mentioned, an inventive mold insert may even be incorporated into a mold at a position where it is not directly adjacent to the molding cavity at all, but influences the field distribution within the molding cavity nonetheless. Even though these possibilities are not further discussed in much detail below, they also form part of the present invention.

The mold insert 210 only comprises one type of material. However, even though the entire mold insert 210 is made of the same material, because the material of the mold insert 210 has different thicknesses in different regions, the material can still 'distort' the permeating electromagnetic field in the desired manner. In addition, a local variation in the density may be used to further enhance this effect, for example.

The mold insert 220 builds on the general construction of the mold insert 210, but now different materials are used in different regions of the mold insert 220. The different materials are called "Material A", "Material B" and "Material C" in FIG. 2. In addition to using such different materials, the dielectric properties (e.g., permittivity, dielectric loss factor) may also be changed locally within one of the given material regions. The "Material A", "Material B" and "Material C" may, for example, be chosen from the materials discussed in the present document, in particular from the materials discussed in the context of FIGS. 3 and 4, potentially with the further constraint that the dielectric loss factor shall be larger than 0.01 (more details on this will follow below).

Finally, the mold insert 230 builds further on the general construction of the mold insert 220, where now three different material structures (made from the same material or from different materials, e.g. from the three different materials "Material A", "Material B" and "Material C" of the mold insert 220) are employed in the different regions. The different material structures are called "Structure A", "Structure B" and "Structure C" in FIG. 2. Here, the additive manufacturing of the inventive mold inserts comes desirably to fruition, since such methods allow for the creation of complicated and 'open' (i.e., including cavities, channels, etc.) inner structures, which may otherwise not be achievable. Such inner structures can, in particular, help to change the local density and/or the local dielectric properties of the different regions or sections of the mold insert 230, and hence the way the mold insert influence the permeating electromagnetic field. As one possible example, the three different structures may comprise air cavities of a different (average) size, resulting in a different (average) density of the mold insert 230 in the respective regions, and hence different permittivity-values.

Instead of three different regions or sections, the mold inserts 220 and 230 may also comprise a different number of regions or sections, e.g., 2 or 4 or 5. The number of different regions or sections may also differ between the top- and the bottom part of the insert (for an insert having both a top and bottom part). Also, the materials used in the top- and the bottom part need not necessarily correspond or be the same, but can also be different, at least partially.

As mentioned, the mold inserts 210, 220 and 230 may be used in a mold (not shown) for the manufacture of a cushioning element for sports apparel, for example, for the manufacture of a midsole for a sports shoe (e.g., a running shoe), from particles of an expanded material, wherein an electromagnetic field is used as an energy carrier to fuse the particle surfaces.

Particles that may be used in the context of the present invention are, in particular, particles of expanded thermoplastic polyurethane (eTPU), expanded polyether-block-amide (ePEBA) and/or expanded polyamide (ePA), as well as mixtures therefrom. These materials have turned out to be desirable for the manufacture of shoe soles, e.g. because of their good energy return and their temperature independence.

Additionally, or alternatively, the particles may also comprise or be comprised of at least one of the following materials: expanded polylactide (ePLA), expanded polyethylene terephthalate (ePET), expanded polybutylene terephthalate (ePBT), expanded thermoplastic polyester ether elastomer (eTPEE), or mixtures thereof.

The mold may comprises an upper mold part and a lower mold part, which cooperate to define a molding cavity in which the cushioning element (e.g. a shoe sole) is molded.

One possibility is that the mold insert completely surrounds the molding cavity (s., e.g., the mold inserts 210, 220 and 230) and hence defines the geometry of the molding cavity. In this case, a bottom part of the mold insert may be placed into the lower mold part, and a top part of the mold insert may be placed into the upper mold part.

Another possibility is that the lower mold part comprises a 'die' or negative which cooperates with an inventive mold insert which is placed into the upper mold part and acts as a 'plunger' or positive, to form the molding cavity when the mold is closed (or the other way around).

For completeness, it is once again mentioned that an inventive mold insert can generally also be arranged at another position within the mold, e.g., be arranged as a layer or sub-layer of the upper or lower part of the mold, without directly influencing the geometry of the molding cavity but still serving to influence and adjust the way in which the electromagnetic field permeates the molding cavity.

Instead of an upper mold part and a lower mold part, a medial and lateral mold part may also be used, for example, or more than two mold parts may be employed. Analogous statements also apply for the mold inserts covered by the present invention.

Returning, for the sake of definiteness, to the case of a mold having an upper mold part and a lower mold part, each of the two mold parts may comprises an electrode used for the provision of the electromagnetic field. In the simplest case, the electrodes may simply be condenser plates or metal plates with simple geometry. In other embodiments, however, the electrodes may also have a shape generally corresponding to the cushioning element that is to be manufactured in the mold, to 'pre-shape' the electromagnetic field for the fusion of the cushioning element. Further 'fine-tuning' of the electromagnetic field can then be achieved by means of an inventive mold insert.

The electromagnetic field generated between the electrodes may provide the energy to fuse the particle surfaces in form of electromagnetic waves in the radiofrequency part of the spectrum of 30 kHz-300 MHz, or in the microwave part of the spectrum of 300 MHz-300 GHz. In a particular embodiment, it provides the energy to fuse the particle surfaces in the form of electromagnetic waves with a frequency in the range of 25-30 MHz.

The two (or more) mold parts may be able to move relative to one another in a first direction (e.g., vertically away from each other) to open the mold and in order to allow loading the mold with the particles, and the mold parts may further be able to move relative to one another in a second direction (e.g., vertically towards each other) to close the mold in order to form the molding cavity between the electrodes.

During loading, the mold may be completely opened, and the two mold parts be entirely separated from one another, or the mold may only be opened partially and to a certain extent, such that the two mold parts still 'engage' with one another to a certain degree and limit the loading volume available for loading the particles into. This 'crack-gap loading' option can serve to influence the physical properties of the manufactured cushioning element already during loading, e.g., its density and stiffness, by controlling the amount of particles that are incorporated into cushioning element and/or the degree of compression the particles experience upon complete closing of the mold. This may also allow manufacturing different kinds of cushioning element with the same mold, by adjusting the crack-gap height (i.e., the extent to which the mold is opened) during loading.

Returning to the discussion of the inventive mold inserts covered by the present invention, like e.g. the mold inserts 210, 220 and 230, a number of different additive manufacturing methods and a number of different base materials may be used for their manufacture.

For example, the additive manufacturing method may comprise at least one of the following methods and processes: 3d printing; a micro-melt-drop based method; a powder-bed based method; stereolithography, SLA; selective laser sintering, SLS; selective laser melting, SLM; continuous liquid interface production, CLIP; fused deposition modeling, FDM; digital light processing, DLP; multi jet modeling, MJM; a polyjet method; a film transfer imaging method, FTI; electron beam melting, EBM; electron beam additive manufacturing, EBAM; subtractive rapid prototyping, SRP.

Moreover, the mold insert may comprises at least one of the following materials: a ceramic filled resin; a cyanate ester; a polylactic acid/polylactide, PLA; an acrylonitrile butadiene styrene, ABS; polyamide 6/nylon 6, PA6; polyamide 66/nylon 66, PA66; polyamide 12/nylon 12, PA12; a polyether ether ketone, PEEK; a binder system; an epoxy resin; a UV-curing thermoset.

Using such methods and materials, the inventive mold inserts may be adapted to locally adjust the field strength of the electromagnetic field inside the molding cavity of the mold, based at least in part on the geometry of the cushioning element. An inventive mold insert may, in particular, be manufactured and provided in this manner which increases the homogeneity of the field strength throughout molding cavity during the manufacture of the cushioning element.

As discussed above, for cushioning elements with a complex geometry, the material distribution with the tool and/or the shape of the electromagnetic field generated by the tool may be such that the electromagnetic field permeating the molding cavity is distorted in such a manner that 'cool spots' and 'hot spots' are created during the fusion of the particles of expanded material via the energy carried and supplied by the electromagnetic field. This can lead to an uneven and potentially even unacceptable end result of the fusion process. The mold insert serves to compensate for and at least partially level out such effects, in order to improve the quality of the production result.

As already mentioned, the local adjustment of the field strength inside the molding cavity can at least partially be caused by a local variation in the dielectric properties of the mold insert.

Of course, other factors like the frequency or intensity distribution of the generated electromagnetic field will generally also influence the distribution of the field inside the molding cavity, as the skilled person understands. But changing the dielectric properties of the mold insert provides a particular handle to tune the field distribution (e.g., the local field strength) inside the molding cavity, which does not require a significant alteration in the general setup and construction of the molding tool, which may be particularly desirable, for example, for prototyping, but also in general as every setup change in the basic machinery may be very time- and cost-consuming.

One specific way to adjust or at least influence the field strength inside the molding cavity is by a local variation in the permittivity of the material of the mold insert.

Figure 3:
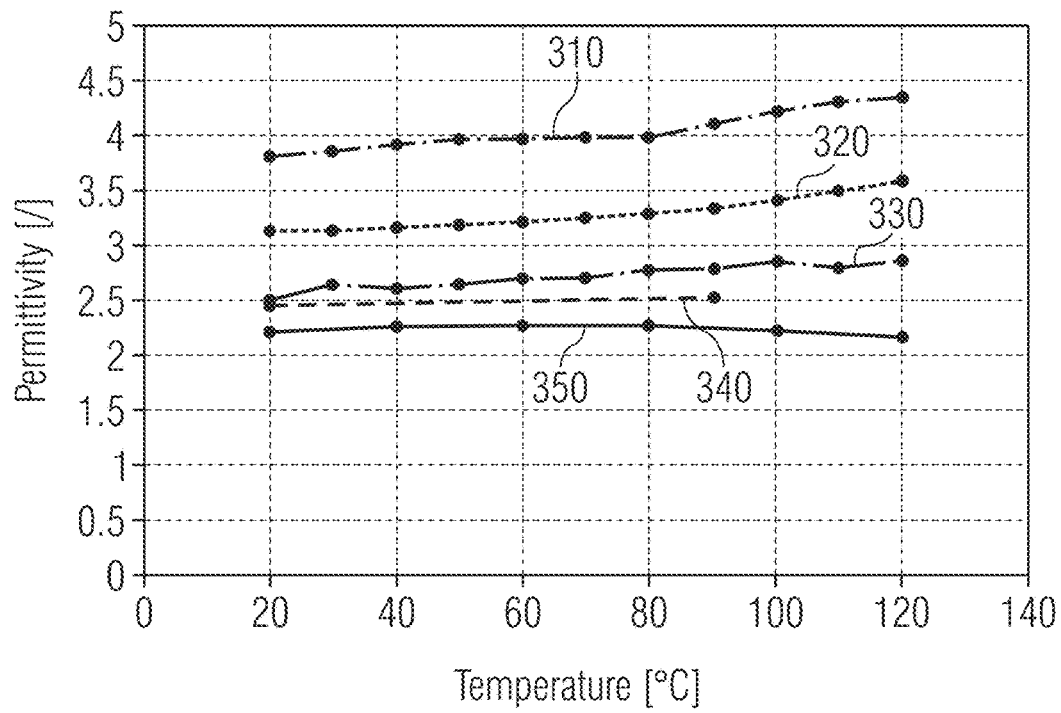
FIG. 3: Permittivity of materials suitable for use in inventive mold inserts.

Values for the (relative) permittivity of materials suitable for use in an inventive mold insert, measured at 27.12 MHz, are shown in FIG. 3:

Curve 310 shows the permittivity of a material called PerFORM with a density of 1.61 g/cm$^3$ over the temperature range from 20° C.-120° C. PerFORM is a ceramic composite stereolithography material.

Curve 320 shows the permittivity of a PET material with a density of 1.39 g/cm$^3$ over the temperature range from 20° C.-120° C.

Curve 330 shows the permittivity of a PLA (polylactide acid) material with a density of 1.24 g/cm$^3$ over the temperature range from 20° C.-120° C.

Curve 340 shows the permittivity of CE 221, which is a cyanate ester resin, with a density of 1.21 g/cm$^3$ over the temperature range from 20° C.-90° C.

Curve 350 shows the permittivity of a PE material with a density of 0.93 g/cm$^3$ over the temperature range from 20° C.-120° C.

With the exception of the PE material, all investigated materials exhibit an increase in permittivity with increasing temperature. Also, for the shown materials, permittivity correlates with the density of the materials, i.e., a higher density means a higher permittivity. Alternatively, or additionally, to using different materials (e.g., the materials discussed in the context of FIG. 3), the local variation in the permittivity of an inventive mold insert can therefore, at least partially, be caused by a local variation in the density of the material of the mold insert. Typically (at the very least for the materials shown in FIG. 3), a higher density of the material of the mold insert results in a higher permittivity of the mold insert. Suitable values for the local density of the material of an inventive mold insert lie between 0.4 g/cm$^3$ and 1.7 g/cm$^3$.

Or, in terms of suitable values for the permittivity, values between 1 and 20 have generally turned out to be desirable to obtain the desired influence on the field distribution within the molding cavity.

Another way to locally adjust or at least influence the field distribution (e.g. the local field strength) inside the molding cavity is by a local variation in the dielectric loss factor of the mold insert.

Figure 4:
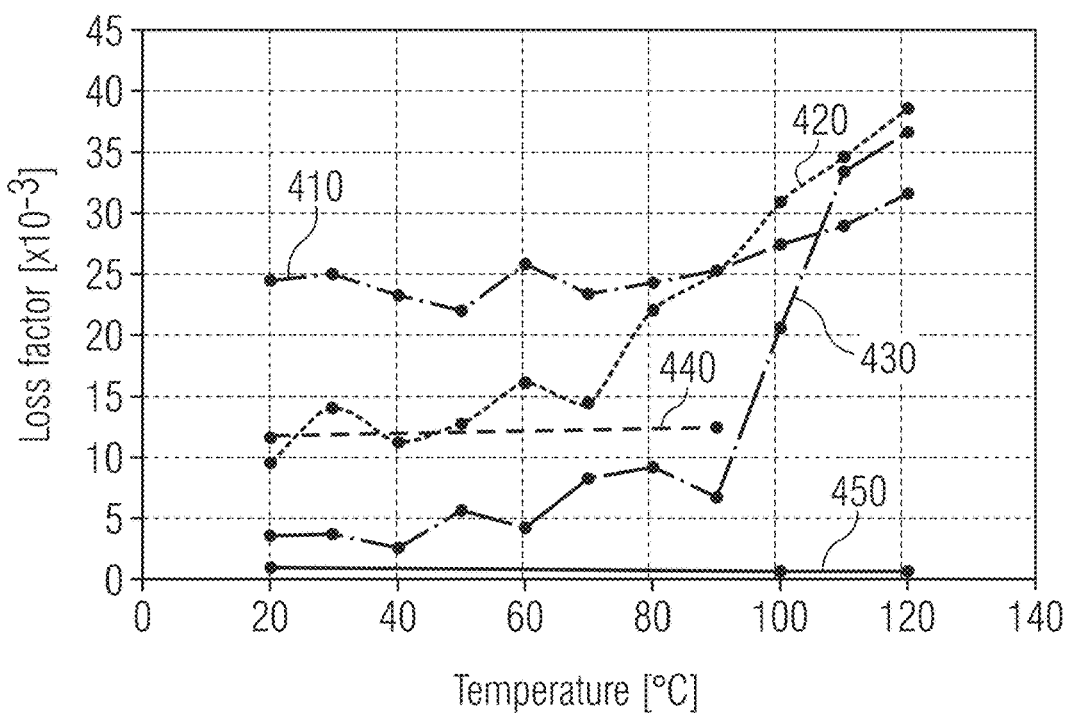
FIG. 4: Dielectric loss factor of the materials of FIG. 3.

Values for the dielectric loss factor of materials generally suitable for use in an inventive mold insert, measured at 27.12 MHz, are shown in FIG. 4 (the materials are the same materials as discussed in the context of FIG. 3 above):

Curve 410 shows the dielectric loss factor of the PerFORM material with the density of 1.61 g/cm$^3$ over the temperature range from 20° C.-120° C.

Curve 420 shows the dielectric loss factor of the PET material with the density of 1.39 g/cm$^3$ over the temperature range from 20° C.-120° C.

Curve 430 shows the dielectric loss factor of the PLA material with the density of 1.24 g/cm$^3$ over the temperature range from 20° C.-120° C.

Curve 440 shows the dielectric loss factor the CE 221 with the density of 1.21 g/cm$^3$ over the temperature range from 20° C.-90° C.

Curve 450 shows the dielectric loss factor of the PE material with the density of 0.93 g/cm$^3$ over the temperature range from 20° C.-120° C.

The PerFORM, PET and PLA materials (s. curves 410, 420 and 430) show a significant increase in the dielectric loss factor with temperature, while the dielectric loss factor of CE 221 and PE materials (s. curves 440 and 450) stays nearly constant.

We once again point out that while the dielectric loss factor (or variations therein) of the material of the mold insert may not directly influence the field distribution (e.g., the local field strength) inside the molding cavity, it may at least do so indirectly. A change in the dielectric loss factor of the material of the mold insert will generally change the heat-up the mold insert experiences when permeated by the electromagnetic field. This local change in temperature in the mold insert can lead to a corresponding variation of the permittivity of the mold insert—which is generally a temperature-dependent quantity, s. FIG. 3, for example—which can then influence the electromagnetic field also outside of the mold insert.

Another impact a (local or global) variation of the dielectric loss factor can have on the results of the fusion process, in particular for the case that the mold insert is arranged directly adjacent to the molding cavity, is the amount of heat-up the mold insert experiences when being subjected to the electromagnetic field, in particular the heat-up at the surface of the mold insert which is facing the molding cavity.

Investigations by the inventors have shown that a certain degree of heat-up of the material surrounding the molding cavity may be desirable for the fusion process, and that entirely without 'pre-heating' the fusion of the surfaces of the particles of expanded material may be insufficient.

In some embodiments of the invention, materials with a (local) dielectric loss factor larger than 0.01 and smaller than 0.10, in particular materials with a (local) dielectric loss factor between 0.01 and 0.07, are therefore used in the mold insert. In this regard, the PE material discussed in the context of FIGS. 3 and 4 is less suited than the other materials, and the PLA material is also less suited below temperatures of roughly 90° C.

Other values are also possible, however, as already mentioned in section III of this document. For example, using polyvinylidene fluoride (PVDF), also called polyvinylidene difluoride, in the construction of the mold insert, values of 0.2 or even higher can also be realized.

In the following further examples are described to facilitate the understanding of the present invention:

1. Mold insert for use in a mold for the manufacture of a cushioning element for sports apparel, a. wherein the cushioning element is manufactured from particles of an expanded material, b. wherein an electromagnetic field is used as an energy carrier to fuse the particle surfaces, c. wherein the mold insert has been manufactured using an additive manufacturing method, and d. wherein the mold insert is adapted to locally adjust the field strength of the electromagnetic field inside a molding cavity of the mold, based at least in part on the geometry of the cushioning element.

2. Mold insert according to example 1, wherein the mold insert is adapted to increase the homogeneity of the field strength throughout molding cavity during the manufacture of the cushioning element.

3. Mold insert according to example 1 or 2, wherein the local adjustment of the field strength inside the molding cavity is at least partially caused by a local variation in the dielectric properties of the mold insert.

4. Mold insert according to example 3, wherein the local adjustment of the field strength inside the molding cavity is at least partially caused by a local variation in the permittivity of the mold insert.

5. Mold insert according to example 4, wherein the local variation in the permittivity of the mold insert is at least partially caused by a local variation in the density of the material of the mold insert.

6. Mold insert according to example 5, where a higher density of the material of the mold insert results in a higher permittivity of the mold insert.

7. Mold insert according to example 5 or 6, wherein the local density of the material of the mold insert lies between 0.4 g/cm$^3$ and 1.7 g/cm$^3$.

8. Mold insert according to one of examples 3-7, wherein the local adjustment of the field strength inside the molding cavity is at least partially caused by a local variation in the dielectric loss factor of the mold insert.

9. Mold insert according to example 8, wherein the local dielectric loss factor of the mold insert lies between 0.01 and 0.10, in particular between 0.01 and 0.07.

10. Mold insert according to one of examples 1-9, wherein the mold insert is arranged adjacent to the molding cavity and influences the geometry of the molding cavity.

11. Mold insert according to one of examples 8 or 9 in combination with example 10, wherein the local variation in the dielectric loss factor further influences the amount of surface heat-up of the surface of the mold insert which is adjacent to the molding cavity during the manufacture of the cushioning element.

12. Mold insert according to one of examples 1-11, wherein the additive manufacturing method for the mold insert comprises at least one of 3d printing; a micro-melt-drop based method; a powder-bed based method; stereolithography, SLA; selective laser sintering, SLS; selective laser melting, SLM; continuous liquid interface production, CLIP; fused deposition modeling, FDM; digital light processing, DLP; multi jet modeling, MJM; a polyjet method; a film transfer imaging method, FTI; electron beam melting, EBM; electron beam additive manufacturing, EBAM; subtractive rapid prototyping, SRP.

13. Mold insert according to one of examples 1-12, wherein the mold insert comprises at least one of the following materials: a ceramic filled resin; a cyanate ester; a polylactic acid/polylactide, PLA; an acrylonitrile butadiene styrene, ABS; polyamide 6/nylon 6, PA6; polyamide 66/nylon 66, PA66; polyamide 12/nylon 12, PA12; a polyether ether ketone, PEEK; a binder system; an epoxy resin; a UV-curing thermoset.

14. Mold insert according to one of examples 1-13, wherein the electromagnetic field provides the energy to fuse the particle surfaces in form of electromagnetic waves in the radiofrequency part of the spectrum of 30 kHz-300 MHz, or in the microwave part of the spectrum of 300 MHz-300 GHz, in particular in the form of electromagnetic waves with a frequency in the range of 25-30 MHz.

15. Mold insert according to one of examples 1-14, wherein the cushioning element is a sole for a shoe, in particular a midsole.

16. Mold for the manufacture of a cushioning element for sports apparel from particles of an expanded material, a. wherein an electromagnetic field is used as an energy carrier to fuse the particle surfaces, and b. wherein the mold comprises a mold insert according to one of examples 1-15.

17. Mold according to example 16, c. wherein the mold comprises at least two mold parts, d. wherein each of the two mold parts comprises an electrode used in the provision of the electromagnetic field, e. wherein the mold insert is placed into one of the two mold parts, f. wherein the two mold parts may be moved relative to one another in a first direction to open the mold in order to allow loading the mold with the particles, and g. wherein the two mold parts may be moved relative to one another in a second direction to close the mold in order to form the molding cavity between the electrodes.

18. Method for the manufacture of a cushioning element for sports apparel from particles of an expanded material, a. wherein an electromagnetic field is used as an energy carrier to fuse the particle surfaces, and b. wherein the method uses a mold according to examples 16 or 17.

19. Cushioning element, in particular, a sole, or a midsole, manufactured with the method according to example 18.

20. Shoe, in particular, a sports shoe, comprising a sole or a midsole according to example 19.

Different arrangements of the components depicted in the drawings or described above, as well as components and steps not shown or described are possible. Similarly, some features and sub-combinations are useful and may be employed without reference to other features and sub-combinations. Embodiments of the invention have been described for illustrative and not restrictive purposes, and alternative embodiments will become apparent to readers of this patent. Accordingly, the present invention is not limited to the embodiments described above or depicted in the drawings, and various embodiments and modifications may be made without departing from the scope of the claims below.

That which is claimed is:

1. A method for manufacturing cushioning elements, the method comprising:
    a) providing a mold comprising:
        i) at least two mold sections, each of the two mold sections comprising an electrode for providing an electromagnetic field, and
        ii) a mold insert manufactured using an additive manufacturing method;
    wherein the mold insert is formed from a ceramic filled resin, a cyanate ester, a polylactic acid/polylactide, an acrylonitrile butadiene styrene, polyamide 6/nylon 6, polyamide 66/nylon 66, polyamide 12/nylon 12, a polyether ether ketone, a binder system, an epoxy resin, a UV-curing thermoset, or combinations thereof;
    b) placing the mold insert in at least one of the two mold sections, wherein the two mold sections are movable relative to each other in a first direction to open the mold;
    c) loading the mold with particles;
    d) closing the mold, wherein the two mold sections are movable relative to each other in a second direction to close the mold, thereby forming a mold cavity between the electrodes; and
    e) applying an electromagnetic field to fuse the surfaces of the particles; wherein the mold insert is adapted to locally adjust a field strength of the electromagnetic field within a cavity of the mold based at least in part on a geometry of the cushioning element.

2. The method of claim 1, wherein the local adjustment of the field strength within the mold cavity is caused at least in part by a local change in the dielectric properties of the mold insert.

3. The method of claim 1, wherein the mold insert at least partially defines a geometry of a mold cavity.

4. A method according to claim 3, wherein the at least two mold parts can be used with different mold inserts for manufacturing a plurality of different cushioning elements.

5. The method of claim 1 wherein the mold has a mold insert that completely surrounds a mold cavity.

6. The method of claim 5, wherein the mold insert comprises a first portion and a second portion, the first portion and the second portion configured to be placed into two mold portions, respectively.

7. The method of claim 1, wherein the geometry of one or both of the electrodes is configured such that the generated electromagnetic field is substantially tuned for use in manufacturing a cushioning element, the mold insert being configured to further tune the electromagnetic field at a finer level.

8. The method of claim 1, wherein two mold parts or at least a part thereof comprise capacitor plates as electrodes.

9. The method of claim 8, wherein the capacitor plates are arranged on the inner side of the mold parts.

10. The method of claim 8, wherein the mold section is comprised of a layered structure comprising a substrate, a template defining at least a portion of the mold cavity, and an insulating layer inside the template.

11. The method of claim 8, wherein a thickness of the template is varied.

12. The method of claim 8, wherein a thickness of the capacitor plate is varied.

13. The method of claim 1, wherein the additive manufacturing process for the mold insert comprises 3d printing, a micro-melt-drop based method, a powder-bed based method, stereolithography, selective laser sintering, selective laser melting, continuous liquid interface production, fused deposition modeling, digital light processing, multi jet modeling, a polyjet method, a film transfer imaging method, electron beam melting, electron beam additive manufacturing, subtractive rapid prototyping, or combinations thereof.

14. The method of claim 1, wherein the electromagnetic field provides energy to fuse the particle surfaces in the form of electromagnetic waves in the radiofrequency part of the spectrum from 30 kHz to 300 MHz.

15. The method of claim 1, wherein the electromagnetic field provides energy to fuse the particle surfaces in the form of electromagnetic waves in the microwave part of the spectrum fro m300 MHz to 300 GHz.

16. The method of claim 1, wherein the particles are particles of an expanded material.

17. The method of claim 1, wherein the particles are expanded thermoplastic polyurethane, expanded polyether-block-amide, expanded polyamide, or combinations thereof.

18. The method of claim 1, wherein the particles are expanded polylactide, expanded polyethylene terephthalate, expanded polybutylene terephthalate, expanded thermoplastic polyester ether elastomer, or combinations thereof.

19. A midsole comprising the cushioning element formed by the method of claim 1.

\* \* \* \* \*